United States Patent

Colson et al.

[11] Patent Number: 5,897,731
[45] Date of Patent: Apr. 27, 1999

[54] METHOD AND APPARATUS FOR MANUFACTURING A LOOPED CELLULAR SHADE

[75] Inventors: Wendell B. Colson, Boulder; Raymond A. Auger, Aspen, both of Colo.

[73] Assignee: Hunter Douglas Inc., Upper Saddle River, N.J.

[21] Appl. No.: 08/916,990

[22] Filed: Aug. 21, 1997

Related U.S. Application Data

[60] Continuation of application No. 08/597,426, Feb. 8, 1996, abandoned, which is a division of application No. 08/233,003, May 4, 1994, Pat. No. 5,503,210, which is a continuation-in-part of application No. 08/058,162, May 4, 1993, Pat. No. 5,547,006.

[51] Int. Cl.$^6$ ........................................ B32B 31/08
[52] U.S. Cl. ........................ 156/197; 156/204; 156/291; 156/292; 160/84.05
[58] Field of Search ................... 156/291, 290, 156/292, 197, 204; 160/84.01, 84.05, 89; 428/185

[56] References Cited

U.S. PATENT DOCUMENTS

| | | |
|---|---|---|
| 675,955 | 6/1901 | Kinnear . |
| 1,764,789 | 6/1930 | Heald . |
| 1,937,342 | 11/1933 | Higbie . |
| 2,140,049 | 12/1938 | Grauel . |
| 2,874,612 | 2/1959 | Luboshez . |
| 3,384,519 | 5/1968 | Froget . |
| 3,487,875 | 1/1970 | Shukat et al. . |
| 4,019,554 | 4/1977 | Rasmussen . |
| 4,194,550 | 3/1980 | Hopper . |
| 4,677,013 | 6/1987 | Anderson ............................ 428/188 |
| 4,907,635 | 3/1990 | Bunger . |
| 4,943,454 | 7/1990 | Neff .................................. 428/188 |
| 5,104,469 | 4/1992 | Colson ............................... 156/197 |
| 5,129,440 | 7/1992 | Colson ............................... 156/197 |
| 5,158,632 | 10/1992 | Colson et al. ....................... 156/197 |

FOREIGN PATENT DOCUMENTS

0060992   6/1943   Denmark .

*Primary Examiner*—Daniel Stemmer
*Attorney, Agent, or Firm*—Dorsey & Whitney LLP

[57] ABSTRACT

A three dimensional cellular shade 20 attached to a roller. The cells 28 of the shade expand outward as the shade is unrolled. The shade is made from two sheets of fabric. One of the fabrics is decorative 24, the other fabric 22 is more functional. The decorative fabric 24 is longer in length than the functional fabric 22. The two fabrics are joined together along a plurality of joints 26 extending down the length of the shade. These joints are uniformly displaced from one another. The ratio of decorative fabric to functional fabric between any two joints is greater than one. This ratio is important for ensuring that the cells will expand outward as the shade is unrolled.

19 Claims, 5 Drawing Sheets

Fig_4

Fig_5

Fig_6

Fig_7

Fig_12

Fig_13

Fig_14

Fig_15

METHOD AND APPARATUS FOR MANUFACTURING A LOOPED CELLULAR SHADE

CROSS-REFERENCE TO RELATED APPLICATIONS

This application is a continuation of application Ser. No. 08/597,426 filed Feb. 8, 1996, which application is a division of application Ser. No. 08/233,003 filed May 4, 1994, now U.S. Pat. No. 5,503,210, which application is a continuation-in-part of application Ser. No. 08/058,162 filed May 4, 1993, now U.S. Pat. No. 5,547,006.

FIELD OF THE INVENTION

This invention relates to the field of window coverings—more specifically, window coverings with a cellular structure.

DISCUSSION OF THE RELATED ART

Cellular shades are well known in the art. A cellular shade, is a shade that, when expanded, has air pockets trapped within its body. This type of shade construction offers several advantages. A cellular shade can be made to insulate windows. The cells of honeycomb cellular shades hide the strings that operate the shade, an improvement over pleated shades. Cellular shades also have enhanced depth of color. The most popular cellular shade is a honeycomb cellular shade. This type of shade is raised and lowered by strings attached to a bottom rail. Another, cellular shade is rolled up on a roller. This type of shade is flat on both its front and back faces.

A typical honeycomb cellular shade is constructed of a plurality of hollow slats or tubes, stacked and then adhered to one another, to form a three-dimensional cellular structure when expanded. In its unexpanded state, the slats or tubes flatten to form a rectangular stack. The height of the stack is dependent on the length of the shade and the material it is made from. An example of this type of cellular shade is shown in U.S. Pat. No. 4,019,554 to Rasmussen.

A typical cellular shade that is rolled up has a structure that includes two or more sheets that are separated from one another by a vane. The vanes define the top and the bottom of each cell and the sheets define the sidewalls. The vane is attached to one or both of the sheets. As mentioned, the shade is generally rolled up on a roller. The roller raises, lowers and operates the vanes of the shade if the vane is attached to both sheets. The two sheets are flat. To roll up the shade, first the vanes are slanted to bring the flat sheets together, then once together, the shade rolls up like a typical roller shade. An example of this type of shade is shown in U.S. Pat. No. 3,384,519 to Froget. Another example of this shade is sold under the trademark SILHOUETTE® by Hunter-Douglas Inc. of Broomfield, Colo.

Cellular roman shades are known in the art. The advantages of a cellular roman shade are the soft, luxurious appearance of the roman shade, combined with the functional attributes of a cellular shade. All cellular roman shades made to date have used cellular honeycomb technology. Instead of creasing both edges of the cell as is done in a typical honeycomb cellular shade, only one edge is creased and the other is left to droop giving the appearance of a roman shade. To operate the shade, strings are attached to a bottom rail that passes through the cellular fabric and is drawn from the bottom into a stack. An example of a cellular roman shade is shown in U.S. Pat. No. 5,104,469 to Colson.

A drawback of the cellular roman shades known in the art is that the pleats may crease when the shade is raised and lowered. This will seriously affect the roman shade appearance of the product. Another drawback is that the cellular roman shades known in the art use a drawstring to raise and lower the shade. Thus, versions of the shade will have a cord dangling from the head rail that could potentially strangle children and animals. Because of these drawbacks, there is a need in the art for providing a cellular roman shade that retains the original fullness of its appearance after multiple raising and lowering. There is also the need in the art for a cellular roman shade that is not operated with a drawstring. It therefore, is an object of this invention to provide an improved cellular roman shade that retains the fullness of its pleats after continued use and that does not require a drawstring for its operation. It is another object of this invention to provide a cellular roman shade that can be constructed with a variety of different fabrics and materials.

SUMMARY OF THE INVENTION

The window covering of the present invention has a structure that includes a first and a second fabric. The first fabric is substantially flat having both a length and a width dimension. The second fabric also has a length and a width dimension. The length dimension of the second fabric is longer than the length dimension of the first fabric. The second fabric is joined to the first fabric along lines that extend across the width of the two fabrics, in intervals down the length of the fabrics. The ratio of the length of the second fabric to the length of the first fabric between any two joints is greater than one.

The window covering may also include a roller on which the window covering is attached. The covering can be selectively rolled upon the roller. This feature provides for ease of use, and safety.

The window covering may also include tubes of fabric in addition to the first and second fabric that are adhered to the joints between the two fabrics to cover the joint line. The tubes can be of various dimensions and colors. In addition to covering the joint line, they also present a pleasant aesthetic appearance.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
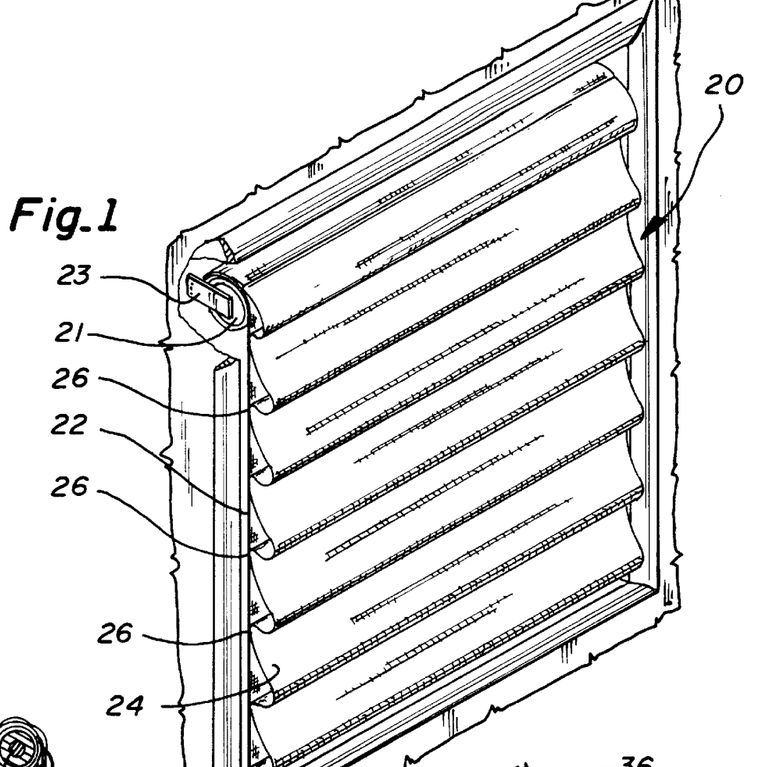
FIG. 1 is an isometric view of the preferred embodiment of the covering of the present invention shown attached to a roller in a window.
Figure 2:
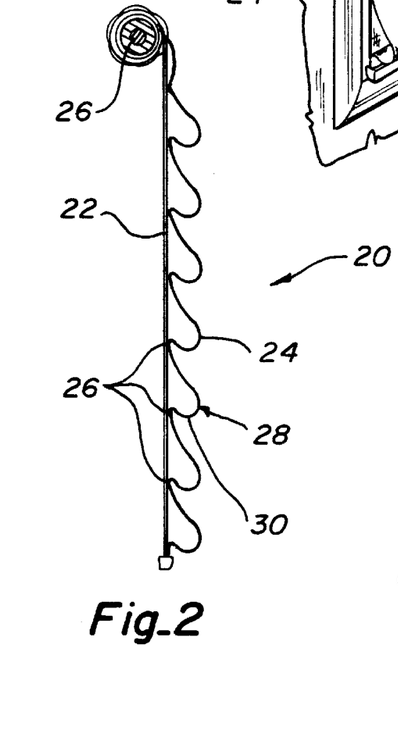
FIG. 2 is a left side view of the covering shown in FIG. 1.
Figure 3:
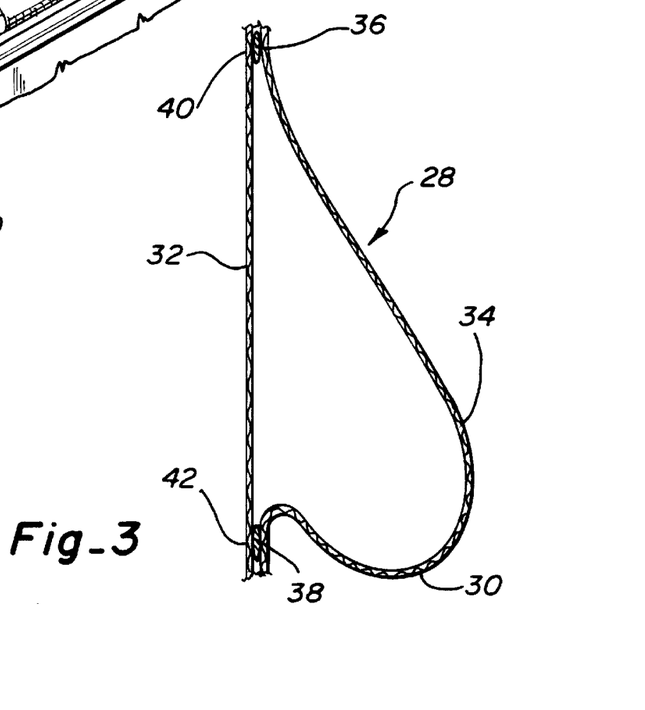
FIG. 3 is a fragmentary enlarged left side view of a single cell of the covering shown in FIG. 1.

A preferred embodiment of the present invention is illustrated by way of example in FIGS. 1–3. A cover for an architectural opening is shown generally as 20. Cover 20 has a first fabric, 22, that is substantially flat. Fabric 22 is preferably made of a 40 gauge polyester knit fabric. This fabric is manufactured by Guilford Mills of Greensboro, N.C., as product No. 34,414. Other materials can be used to manufacture first fabric 22. Examples of other materials that can be used as first fabric include, but are not limited to, polymer films, nonwovens, woven fabrics, knits, and felts.

A second fabric, 24, is attached to the first fabric 22. The length of the second fabric 24 is greater than the length of the first fabric 22. The second fabric 24 is generally made of richer-looking fabrics than the first fabric 22 because the second fabric is generally the decorative side of the window cover. The preferred fabric is a satin weave polyester manufactured by Burlington Mills of Greensboro, N.C. Of particular interest in this weave is that one side of the fabric is formal and the other side of the fabric is casual. This allows one fabric to be used to generate two distinct looks. Other fabrics and materials that could be used to manufacture fabric 24 include, but are not limited to, films, nonwovens, knits, woven fabrics, sheers, and felts.

The second fabric 24 is attached to the first fabric 22 at a plurality of joints 26. In the preferred embodiment, joints 26 are spaced at an equal interval from one another. The interval can be any distance. A favorable range of distances between joints is between about one inch and six inches with the preferred distance being three inches.

The ratio of the length of second fabric 24 to the length of first fabric 22 between joints 26 is constant for all the intervals on a particular covering. The preferred ratio is about 1.66 for the two preferred fabrics 22 and 24. This ratio may change for different types of fabrics. Varying this ratio will result in products with different functions and aesthetic attributes. The 1.66 ratio provides for a loop 28 that has a loop bottom 30 which hangs lower than the lowermost one of the two joints 26 that define upper and lower edges of the loop. In this configuration, loop 28 hides the lower joint 26 from sight.

The distance the loop drops is dependent on the fabric used for the second fabric 24. A fabric that has stiff fibers along the length dimension of the shade will not droop as much as a fabric that has limp fibers in the length direction. If a limp fabric is used, the ratio of lengths of the first fabric and the second fabric can be adjusted to achieve a preferred drop. A preferred drop being that amount of drop which covers the lower joint 26 when viewed from a line that is transverse to the plane defined by the first fabric 22.

If the cover is to be raised and lowered relative to a window covering by rolling the cover about a roller as opposed to lifting and gathering the cover similarly to a mini-blind or typical cellular shade, roll-up problems can be encountered due to the fact that the cover has two layers and there is therefore a circumferential differential for each layer of the cover as it is rolled about the roller. If the amount of the second fabric in each interval is exactly the same as required for both fabrics to roll up without stress to either, then, when the fabrics are unrolled, a small air pocket or cell will be created between the two fabrics. This pocket or cell expands outwardly as the fabrics are unrolled. As the roll diameter grows, this pocket becomes thinner, again assuming a roll-up without stress to either fabric, becoming both thermally and decoratively less desirable. However, if the second fabric is made slightly larger than that which results in a perfect accommodation to being rolled up, the cells so created will be noticeable for the full length of the shade which may satisfy more shade buyers. Unfolded cells, that is, cells so thin that there is no folding of the decorative fabric when they are rolled up, have some value in stiffening a shade fabric across its width and in giving it modest surface waviness but are less desirable aesthetically.

To take full advantage of the cellular expansion caused by the circumferential difference between the two fabrics on the roll and to satisfactorily deal with the aforenoted factors, cells are created in flat product before the product is rolled up. The cells as shown in FIGS. 1–4 and the alternate embodiments of the invention are created by an excess of the second fabric relative to the first fabric. When the finished product is rolled upon a roller, the cells are flattened against the diameter of the rolls to create the exact circumferential difference due to roll diameter. Creases are formed when the cells flatten and the creases conform to the circumferential difference of the roll diameter. When the roll is unrolled, the cells expand outward due to the flattening of the first fabric and the position of the crease caused by creasing on a roll. The excess fabric may also hide the joint when the shade is pulled open.

Figure 5:
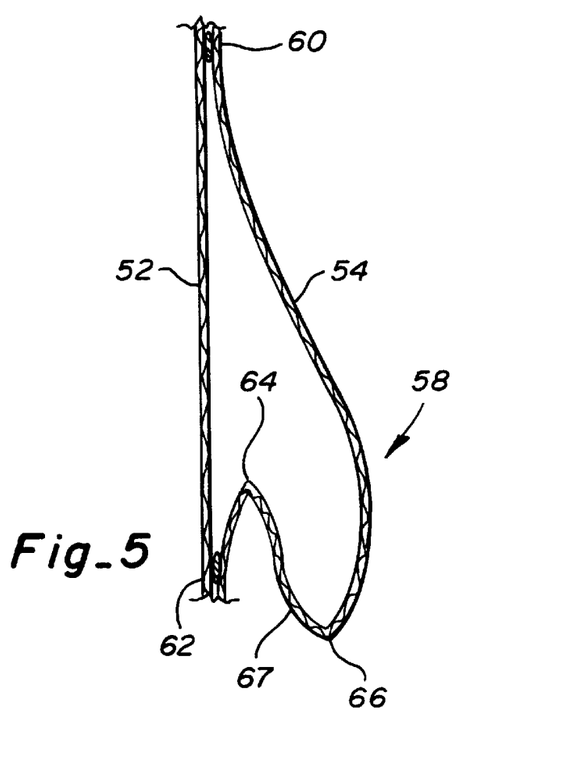
FIG. 5 is a fragmentary enlarged left side view of a single cell of the covering shown in FIG. 4.

A side benefit to having creases resides in the fact that as the tension of roll up on the cell is released, the crease acts as a spring and tries to push the cell open. This is valuable because it further augments the expansion caused by circumferential difference. This degree of additional expansion depends on the dimensional stability of the semi-creasable fabric. Referring to FIG. 5, creases 64 and 66 bias the second fabric away from first fabric 52. If the fabric distance between creases 64 and 66 is not too short or not too long, then upward face 67 is created, augmenting the face fabric in compression factor and increasing pleat fullness.

Joint 26 is preferably an adhesive joint, though an ultrasonically fused joint, heat-fused joint, sewn joint or other type of joint will work. As shown in FIG. 3 the adhesive is placed between first sheet 32 and second sheet 34. The location of adhesive beads 36 and 38 define the position of joints 40 and 42. The distance between joint 40 and joint 42 is the length of an interval. A plurality of joints make up a single cover, thus each cover has a number of intervals.

The preferred adhesive used to join sheets 32 and 34 is a polyester copolymer that has a melt point below 120° C. This adhesive adheres well to polyester fabrics because of the nature of the backbone of the polymer. If other fabrics are used in place of the preferred fabrics, a different adhesive may be required to achieve a suitable bond strength.

Referring again to FIGS. 1 and 2, cover 20 is attached to a roller 21. Roller 21 can be any variety of roller shade hardware system. One such system is manufactured by General Clutch Corporation of Stamford, Conn. under the trademark ROLL-EASE. The roller may be conventionally spring activated or operated by a conventional clutch mechanism that is driven by a loop cord, the cord being of a suitable length so that it may be positioned out of reach of a child.

To attach cover 20 to roller 21, a piece of double sided tape is laid down along the length of roller 21. The conventional release paper found on such tape is removed from the tape and then sheet 22 of cover 20 is laid onto the adhesive and pressed into place. It is very important that joints 26 are parallel to the length of roller 21. This insures that cover 20 will not skew. It is also possible to use mechanical fastening methods to hold cover 20 to roller 21. One such conventional method uses a groove in the roller, and a slat insert. Sheet 22 is placed around the slat and the slat is inserted into the groove. This pinches sheet 22 between the slat and the grooving, holding sheet 22 in place. Cover 20 is preferably rolled up so that the first fabric is always the inside diameter fabric in relation to the second fabric.

Cover 20 is mounted adjacent to a window opening with mounting brackets 23. Mounting brackets 23 are attachable to the end of roller 21. Brackets 23 are mounted adjacent to the opening the cover is intended to protect and overlie. Any number of well-known mounting brackets may be used with this invention. Brackets are included with the ROLL-EASE roller system discussed above.

Because the second fabric when rolled up, is always at a greater radius from the roller then the first fabric, presuming the material is rolled so that the second fabric is always external to the first fabric, then the extra amount of second fabric will expand outward from the first fabric when the shade is unrolled, creating an open cell. The curvature set in the fabric by being rolled also assists this process. Because the second fabric is rolled and not gathered like a conventional cellular roman shade, the second fabric will retain its fullness after repeated use.

Figure 4:
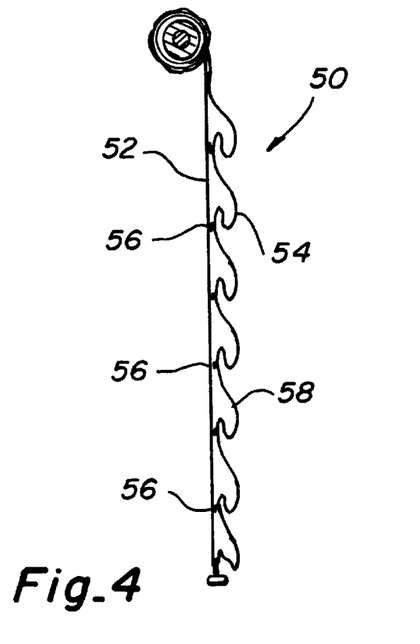
FIG. 4 is a left side view of a second embodiment of the covering of the present invention.

Shown in FIGS. 4 and 5 is another embodiment of the invention. This design is similar to that shown in FIGS. 1 through 3, the difference being that the loop is creased. Cover 50 has a first fabric 52 and a second fabric 54. Second fabric 54 is attached to the first fabric 52 at joints 56. The second fabric 54 is longer than the first fabric 52 so that the ratio of sheet lengths between joints is greater than one. The loop 58 defined by second fabric 54 between joints 60 and 62 is creased in two places. Crease 64 is an inside crease, crease 66 is an outside crease.

The amount of creasing loop 58 will develop when rolled up is a function of the length ratio between joints of first sheet 52 and the second sheet 54, and the type of material used for the second sheet 54. The material has a greater impact on creasing than the loop size.

If the material used for the second sheet is made of a polymer that does not absorb moisture, creasing will be minimized. One such material is polyester. Other materials include, but are not limited to, polypropylene, and polyethylene. If the second fabric is made of a material that does absorb moisture, creasing is likely. Examples of such materials are nylons, rayons and cottons. The looped cover when rolled-up will generally fold or crease. If moisture is present and the second sheet is made of the group of material that absorbs some moisture, the crease will set. Because the crease results from being rolled up, the position of creases 64 and 66 will vary from loop to loop due to the changing diameter of the roll as the cover is rolled up.

Figure 6:
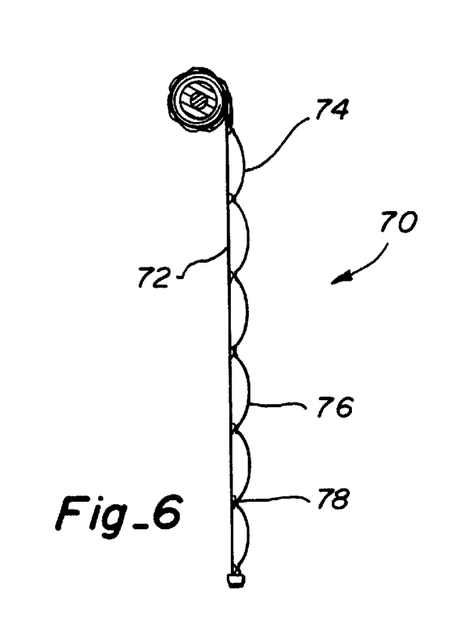
FIG. 6 is a left side view of a third embodiment of the covering of the present invention.

FIG. 6 shows another cover 70 that has a length ratio of the second fabric 74 to the first fabric 72, within each interval, that is less than about 1.4. This ratio results in a loop 76 that is somewhat symmetric and that does not hide the joint 78. Of course, the ratio of 1.4 is dependent on the fabrics used.

Figure 7:
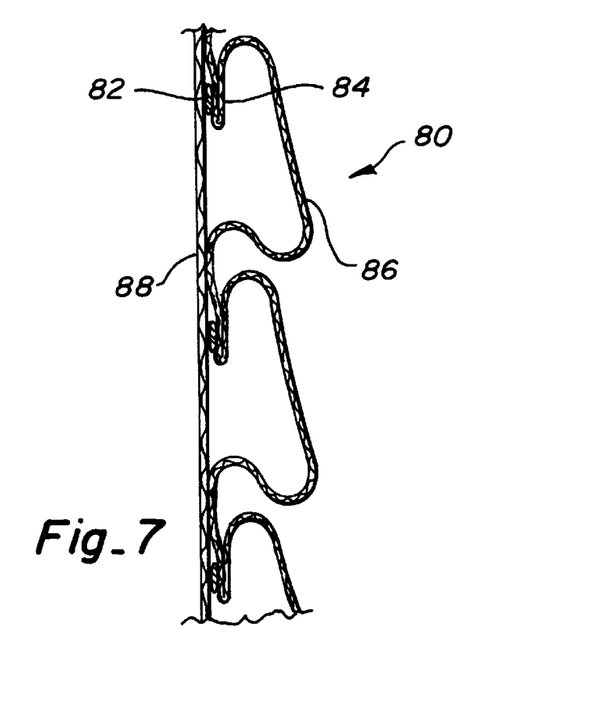
FIG. 7 is a left side view of a fourth embodiment of the covering of the present invention.

FIG. 7 shows still another cover 80 that has two different types of joints. Joint 82, located on the top of loop 84, is made by attaching second fabric 86 to first fabric 88 and then folding loop 84 back onto joint 82. The resultant loop is somewhat fuller than that of the cover shown in FIGS. 1–3.

Figure 8:
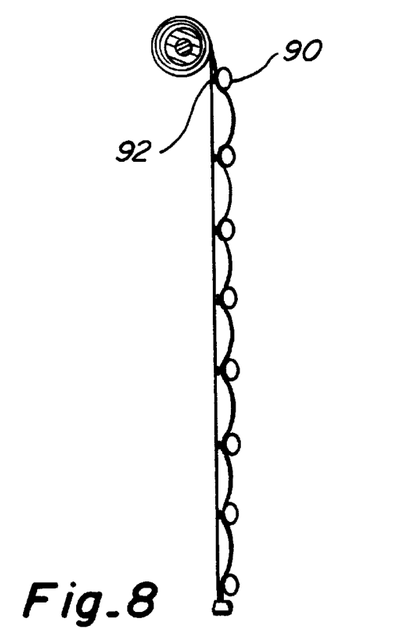
FIG. 8 is a left side view of a fifth embodiment of the covering of the present invention.

FIG. 8 shows another construction of the invention in which a tube 90 is used to hide joint 92. Tube 90 can be constructed of any type of material. A 38 g/m2 polyester spunbonded nonwoven is a typical material. The tube is attached to joint 92 with an adhesive. The tube can have a variety of diameters preferably ranging in size from ¼" to over 2 inches. The tube may have different cross-sectional shapes; it may have a contrasting color; and it may be incorporated into covers with various loop sizes and shapes.

Figure 9:
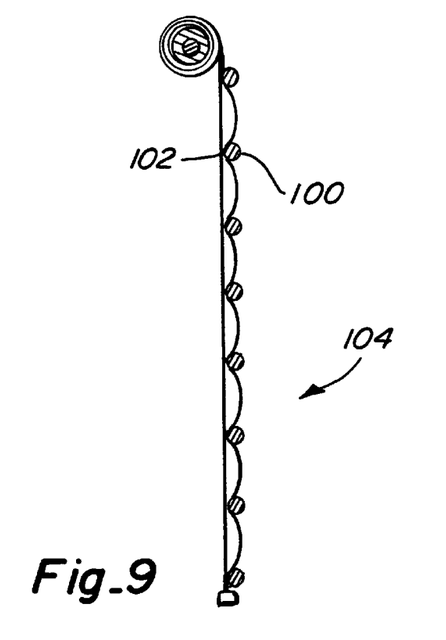
FIG. 9 is a left side view of a sixth alternate embodiment of the covering of the present invention.

Rather than a tube, a solid bead 100 of material is added to cover the joints 102 of cover 104 shown in FIG. 9. The bead of material may be a cord, a strip of plastic, a rope or some other material. Bead 100 is adhesively secured to joint 102.

Figure 10:
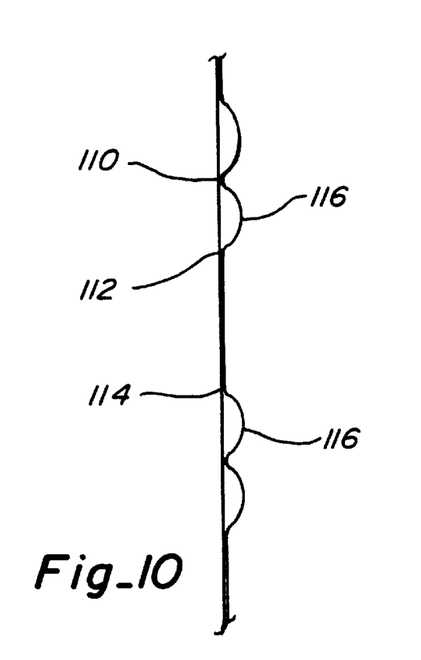
FIG. 10 is a left side view of a seventh embodiment of the covering of the present invention.

An interesting variation of the preferred embodiment uses a plurality of different intervals between joints instead of a single interval. This is represented by the cover shown in FIG. 10. The interval represented by the difference in length between joints 110 and 112 is different from the interval represented by the difference between joints 112 and 114. This creates a very interesting aesthetic effect. Loops 116 can be of any dimension large or small.

Figure 11:
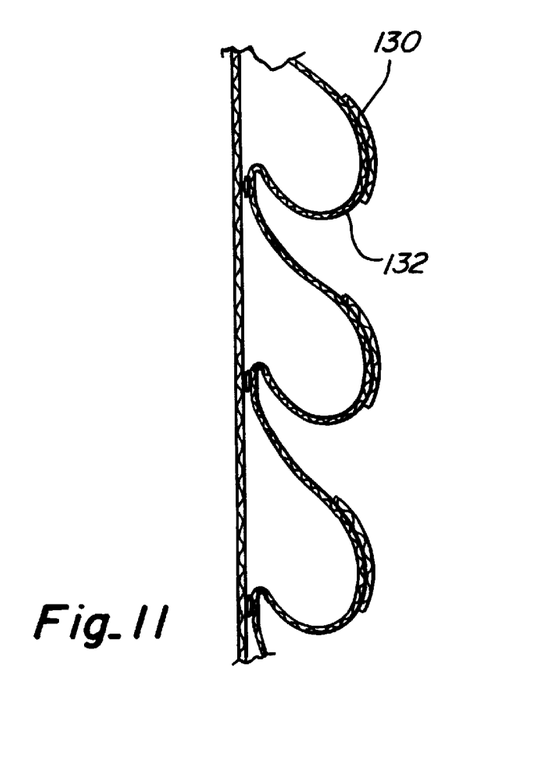
FIG. 11 is left side view of an eighth embodiment of the covering of the present invention.
Figure 12:
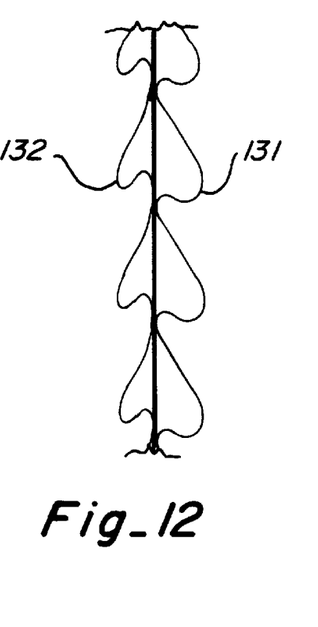
FIG. 12 is a left side view of a ninth embodiment of the covering of the present invention.
Figure 13:
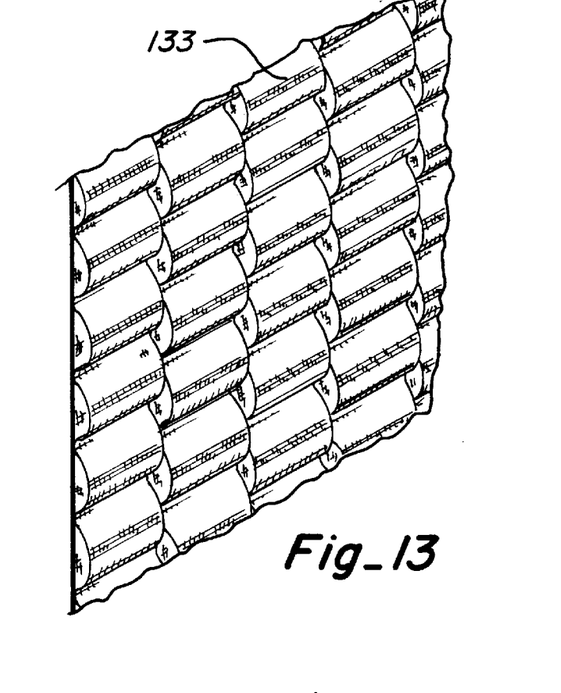
FIG. 13 is a front view of a tenth embodiment of the covering of the present invention.
Figure 14:
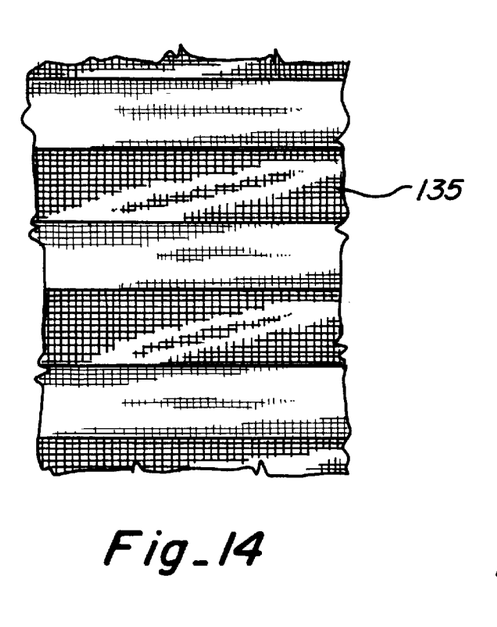
FIG. 14 is a front view of an eleventh embodiment of the covering of the present invention.

Some other variations of this invention include applying a laminate strip 130 to the top of each loop 132 as shown in FIG. 11; or using sheets of fabric 131 that are three-dimensional on both sides of the cover as represented in FIG. 12; or using vertical strips 133 of fabric as the second sheet to produce loops of different shape, size, and color as shown in FIG. 13; or using horizontal strips 135 to provide different colored and textured loops as shown in FIG. 14.

Cells located on both sides of a base fabric allow the decorative cellular shape to face the window and the room. However in this case, the window cells will be more flattened than the room facing cells, as they will be rolled up facing the roller.

Figure 15:
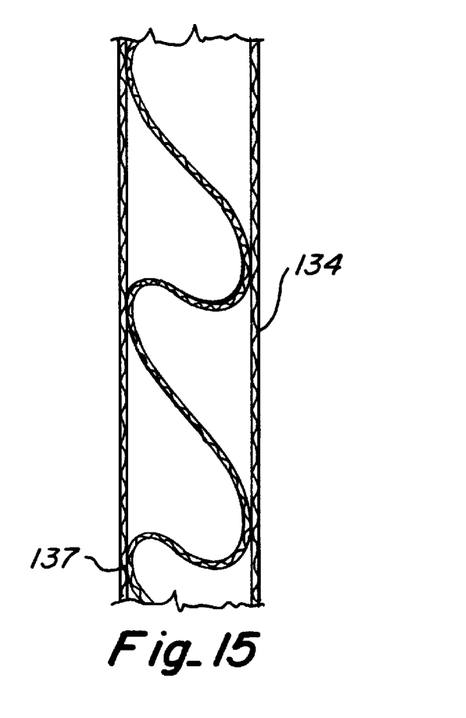
FIG. 15 is a left side view of a twelfth embodiment of the covering of the present invention.

FIG. 15 shows a free-hanging fabric 134 attached to the roller in front of the cells, and its bottom attached to the base fabric 137. In this configuration, air is trapped between the fabric and the cells greatly improving the insulating capability of the shades. The free-hanging fabric 134 may also be made of semi-transparent material creating an aesthetic effect in front of the cells of the shade, and need not, for thermal reasons, be attached to the bottom of the cellular shade, but instead may have its own hem bar.

Figure 16:
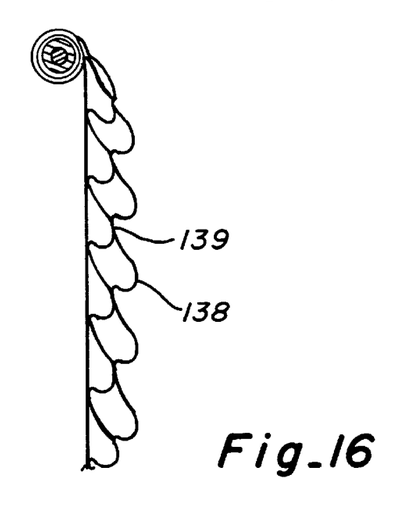
FIG. 16 is a left side view of a thirteenth embodiment of the covering of the present invention.

FIG. 16 represents the cellular structure of FIG. 4 with a second layer of cells 138, similar to the first layer, attached to it to improve its insulating value. Additional layers may be added in a similar manner, with the attachment lines 139 for the new layer in the middle of the mounted cell in each case.

Figure 17:
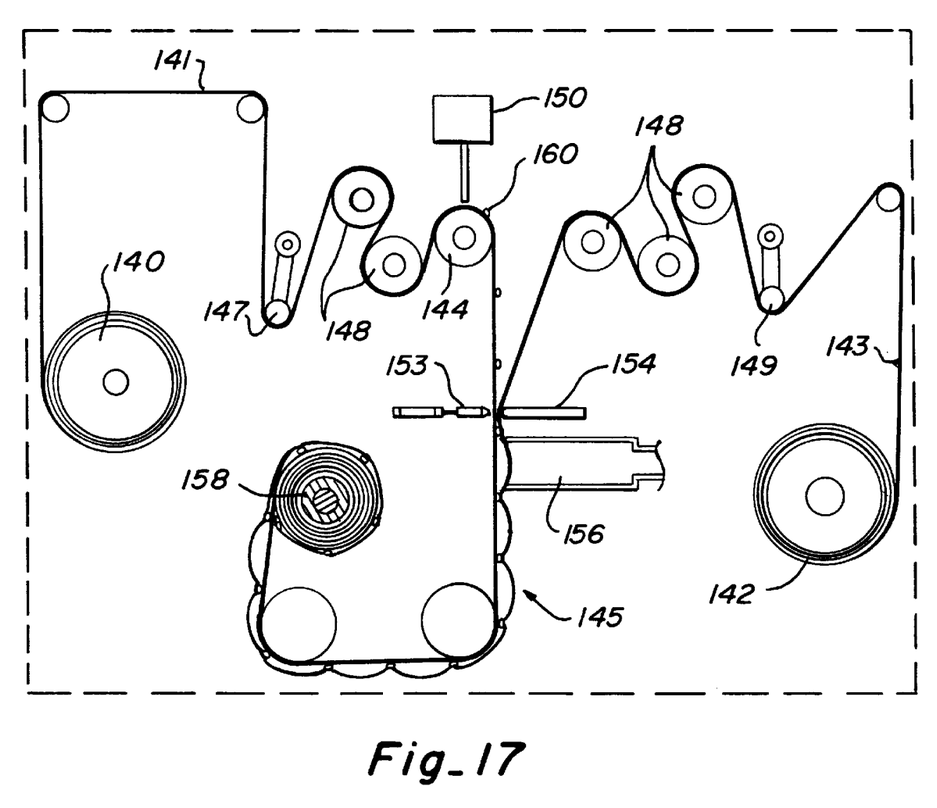
FIG. 17 is a diagrammatic representation of the method of manufacturing the covering of FIG. 1.

Referring now to FIG. 17, a diagrammatic representation of an apparatus for making the embodiment of FIGS. 1–3 is shown. To produce the cellular structure, a first fabric 141 and a second fabric 143 are provided. The second fabric 143 must be fed faster than the first fabric 141 to provide excess fabric for forming loops. The excess second fabric must be drawn away from the first fabric and then the second fabric must be fixedly joined to the first fabric at a point above the drawn excess second fabric. The assembly 145 of the first and second fabric must then be collected for storage and further processing.

Two unwind rolls of fabric are provided, one to support a master roll of first fabric 147, one to support a master roll of second fabric 143. The unwind rolls 140 and 142 in the preferred embodiment are not driven, instead they are outfitted with a conventional pneumatic brake (not shown) to inhibit their rotation. The brake can be adjusted to provide different levels of tension. The tension the brake provides can be further controlled using a conventional tension controller that may include a taper card to account for tension changes caused by a decrease in the roll diameter and subsequently a decrease in the weight of the roll. The unwind rolls are attached to and supported by a main frame of the machine.

The first fabric 141 and the second fabric 143 are fed from each of their respective unwind rollers through dancer rollers 147 and 149 respectively and a series of drive rollers 148. The dancer rollers help maintain constant tension on the fabric and adjusts for varying speeds of fabric. The series of drive rollers 148 help to align the fabric and feed the fabric to the loop forming section and the sealer. The last drive roller 144 for the first fabric is made of silicone rubber and is positioned under a glue head 150 that moves linearally along the full width of the first fabric. The silicone rubber roller is resistant to the heat of the adhesive and does not bond to the adhesive.

The roller 144 is also tacky which helps drive the material through the equipment. The first fabric 141 is in intimate contact with the portion of the silicone supply roller that passes under the adhesive head. The first fabric is positioned between the drive roller 144 and the adhesive head.

The fabric stops periodically to be joined and to have adhesive 160 applied. The drive mechanism is an intermittent drive type. The rollers on the machine preferably go through one full rotation for every bond. Drive mechanisms of this type are well known. One typical example of this type of drive is a "Geneva Mechanism" manufactured by Geneva Systems of Tampa, Fla.

When the drive rollers are locked, adhesive is applied. The adhesive 160 is applied in a fine line transverse to the direction of the fabric movement before the drive rollers were locked. The adhesive head is mounted to a linear track (not shown) and is driven along the length of the track. A synchronous drive, drives a positive displacement rotary pump that supplies adhesive to the glue head. This insures that an equal amount of adhesive will be applied regardless of the speed of travel of the adhesive head. Once the adhesive is applied across the full width of the first fabric, the drive rolls are driven and both sheets of fabric progress forward.

The rate at which the first fabric progresses in comparison to the rate at which the second fabric progresses is determined by the size of the gear that drives the respective drive rollers of each fabric. The gears can be sized to provide any preselected ratio of speed for the second fabric to the first fabric. Once the adhesive is applied to the first fabric, both the first fabric and the second fabric advance through an adhesive reactivation unit at the speeds necessary to provide the proper ratio of second fabric length to first fabric length. Both fabrics are stopped and then the bonding of the fabric occurs.

The adhesive reactivation unit can be any of several devices. The preferred device is a conventional ultrasonic welding assembly including an ultrasonic horn 153 in combination with an anvil 154. The horn 153 is separated from the anvil 154 by a gap of about an inch. This allows for easy transfer of the fabric through the reactivation unit. When the fabrics are to be joined, the progression of the fabric through the machine stops, this stop is at the same time that adhesive is applied. It will be appreciated that the machine could stop twice, once to apply the adhesive and then again to reactivate the adhesive, but in such case, the spacing interval between the adhesive applicator head and the adhesive reactivation unit is not a common denominator of the spacing between joints. The preferred method is to have both adhesive application and adhesive bonding occur at the same time. Once stopped, the line of adhesive previously applied is in alignment with the horn 153 and the anvil 154. The horn 153 is moved into contact with the fabrics and the anvil 154 which causes the first fabric to bind to the second fabric. Once enough time is passed to adequately bond the adhesive, the fabric progresses. Alternate methods of reactivating the adhesive include the use of a heated nip roll followed by a cooled nip roll, or a heated shoe that operates similar to the ultrasonic unit. Alternate methods of joining the fabrics include sewing, ultrasonic sealing and other like methods.

Located directly under the horn and the anvil is a vacuum duct 156. The vacuum duct runs the full width of the fabric. The entrance of the duct is a rectangle about 2 inches wide and the length of the roller 144. A negative pressure of 2–3 inches $H_2O$ is drawn through the entrance of the duct. This negative pressure is accomplished with a conventional high volume centrifugal blower (not shown) to which the duct is attached to the entrance port of the blower. The blower moves about 1,000 cubic feet of air per minute.

The vacuum duct 156 draws the excess second fabric 143 away from the first fabric 141. It also draws the excess fabric away from between the horn and the anvil. In a sense, the duct acts as a tensioned accumulator for the second fabric before reactivation of the adhesive and subsequent joining of the fabrics. The use of a vacuum duct results in a uniform loop that does not have wrinkles.

Once the two fabrics are joined the process is repeated to form another loop, and then another loop and on and on. The assembled fabric 145 is then rolled onto a collection roller 158. This is done at low tension to help minimize premature creasing of the loops prior to final use. The fabric is rolled onto a core that is preferably 3 inches in diameter or less. A 3-inch diameter core is used to come as close as possible to the diameter of a roller the fabric would ultimately be rolled upon. Should the loops of the fabric assembly crease, they will crease in a position close to that of the actual window covering when in use. Temporary creasing in the wrong position will typically occur, but temporary creasing that is close to the right position (creasing on the actual roller) is acceptable, and is generally reversible. If the crease is way off, it becomes far more difficult to recrease in the proper position. The preferred length of the fabric on a collection roll is about 200 feet, though more fabric could be stored. More than 200 feet of fabric on a roll expands the outside diameter of the roll to a point at which temporary creasing in the wrong position could possibly occur.

It is important to note that the collection roller 158 is driven at the same speed or slightly faster than the drive rollers of the first fabric. This is done to maintain constant tension on the first fabric so that the first fabric will not be pulled into the vacuum duct along with the second fabric.

It is important to consider when designing a shade made in accordance with the present invention that the thickness of the fabric used for shades determines roller diameter, however, in the case of the present invention, the fold lines have two extra layers of fabric for short distances. Were the distance between the fold lines to be exactly equal to the circumference of the rolled up fabric, there would be a case where all of the fold lines would fall atop each other, making the fabric roll eccentric in diameter. This would also be true for whole multiples or divisors of the circumference. Because the circumference of the rolled fabric changes with each of its revolutions, were all the cells of the same height, only a few fold lines might fall immediately on top of each other. However, a way to prevent this undesirable effect is to prevent any cell height, when it is less than its roll circumference from being a whole number divisor of its roll circumference. When cell height is greater than its roll circumference, its height, when divisible by a whole number, should not equal roll circumference.

While the present invention has been disclosed in connection with the preferred embodiment thereof, it should be understood that there may be other embodiments which fall within the spirit and scope of the invention as defined by the following claims.

One such embodiment includes sealing the ends of the cells to permit them to slide in narrow tracks to improve the edge-seal of the shades in window frames.

Another such embodiment may use an open mesh for the window-facing fabric, in which case the cover can be used for privacy in warm weather while still permitting air flow through it.

Yet another such embodiment may include using a metallized fabric or film for the first fabric to provide blackout capabilities for the cover.

It should also be understood that when a shade is made of vertical strips of cells as shown in FIG. 13, a fabric change may occur at any cell by bonding a different fabric to the strip at that point, creating a change of color in a vertical direction.

The invention claimed is:

1. A method of fabricating an article for light and vision control comprising the steps of:
   providing continuous supplies of first and second sheet materials,
   establishing a location of bonding said second sheet of material to said first sheet of material along spaced parallel joint lines,
   feeding said first and second materials under tension to said location at preselected rates, the rate of feed of said second material being faster than the rate of feed of said first material such that an excess quantity of said second material relative to said first material is fed to said location in a unit of time,
   maintaining said tension in said first and second materials using a driven collection roll and unwind rolls having rotation inhibiting means,
   applying a bonding medium to one of said first or second materials along a projected joint line prior to said one of the materials reaching said location, and
   moving said first and second materials into bonding engagement along said joint lines at said location.

2. The method of claim 1, further including the step of exposing said second material to a vacuum source downstream from said location to draw said excess second material away from said first material prior to bonding said sheets of material at said location.

3. The method of claim 2, wherein said sheets of material are fed to said location by drive rollers.

4. The method of claim 1 wherein said bonding medium is applied to said first material.

5. The method of claim 1, wherein said bonding medium is applied in a continuous line.

6. The method of claim 2, wherein said loop is formed immediately adjacent to said location.

7. The method of claim 1, wherein said first and second sheet materials each consist of a single, continuous sheet of material.

8. The method of claim 1, wherein after said moving step moves said first and second materials into bonding engagement, said method further comprising the step of using an ultrasonic welder to reactivate said bonding medium.

9. The method of claim 1 wherein said maintaining tension step further comprises using dancer rollers that press on said first and second materials between said collection roll and said unwind rolls.

10. The method of claim 1 wherein said maintaining tension step further comprises using a pneumatic brake as said rotation inhibiting means.

11. The method of claim 1, wherein said collection roller has a circumference that is not a whole number multiple of a distance between said spaced parallel joint lines.

12. The method of claim 1, wherein said collection roller has a circumference that is not a whole number divisor of a distance between said spaced parallel joint lines.

13. The method of claim 2, further comprising positioning the bonded materials on said collection roller such that said spaced parallel joint lines do not stack one upon another.

14. The method of claim 13 wherein a circumference of said collection roller is not a whole number multiple of a distance between said spaced parallel joint lines.

15. The method of claim 13 wherein a distance between said spaced parallel joint lines is not a whole number multiple of a circumference of said collection roller.

16. A method of fabricating an article for light and vision control comprising the steps of:
   providing continuous supplies of first and second sheet materials using unwind rolls having rotation inhibiting means,
   establishing an application location where a bonding medium is applied to one of said first and second materials,
   establishing a bonding location where said first sheet of material is bonded to said second sheet of material along spaced parallel joint lines, said bonding location being downstream of said application location, feeding with drive rollers said first and second materials under tension to said application location and said bonding location at preselected rates, the rate of feed of said second material being faster than the rate of feed of said first material such that an excess quantity of said second material relative to said first material is fed to said bonding location in a unit of time, intermittently stopping said drive rollers, applying, at said application location, a bonding medium to said one of said first and second materials along a projected joint line while said drive rollers are intermittently stopped, and reactivating, at said bonding location, said bonding medium while said drive rollers are intermittently stopped and while exposing said second material to a vacuum source at said bonding location to draw said excess second material away from said first material prior to bonding said sheets of material.

17. The method of claim 16 wherein said feeding step further comprises maintaining said tension using said rotation inhibiting means of said unwind rolls in conjunction with a driven collection roll for collecting said bonded first and second materials.

18. The method of claim 17 wherein said feeding step further comprises using a pneumatic brake as said rotation inhibiting means.

19. The method of claim 16 wherein said applying step and said reactivating step occur substantially simultaneously.

* * * * *